United States Patent [19]
Chen

[11] Patent Number: 5,826,839
[45] Date of Patent: Oct. 27, 1998

[54] KEYBOARD WITH WRIST SUPPORT

[76] Inventor: Frank Chen, 2F, No. 2, Alley 10, Lane 131, Sec. 1, Chung Jen Rd., Peitou, Taipei, Taiwan

[21] Appl. No.: 797,923

[22] Filed: Feb. 12, 1997

[51] Int. Cl.⁶ .................................................... B68G 5/00
[52] U.S. Cl. ........................................... 248/118; 400/472
[58] Field of Search .................................. 248/118, 118.1, 248/118.3, 118.5, 918; 403/154, 316; 400/472; 16/381

[56] References Cited

U.S. PATENT DOCUMENTS

| | | | |
|---|---|---|---|
| 5,073,050 | 12/1991 | Andrews | 400/82 |
| 5,244,296 | 9/1993 | Jensen | 400/715 |
| 5,346,164 | 9/1994 | Allen | 248/118 |
| 5,375,800 | 12/1994 | Wilcox et al. | 248/118.1 |
| 5,492,291 | 2/1996 | Otani | 248/118.1 |
| 5,513,824 | 5/1996 | Leavitt et al. | 248/118.1 |
| 5,660,360 | 8/1997 | Yang | 248/118 |

*Primary Examiner*—Ramon O. Ramirez
*Assistant Examiner*—Anita M. King

[57] ABSTRACT

A keyboard with wrist support comprising a wrist support having a plurality of connecting plates at the rear end surface of said wrist support is provided. The connecting plates are provided with a pair of connecting arm at both ends respectively. Each of the connecting arms is provided with a pin shaft. The bottom of the front end surface of the keyboard is provided with a pair of connecting slots corresponding to the connecting plates of the wrist support. The side walls of the connecting slots are provided with pin holes corresponding to the pin shaft of the connecting arms such that the pin shaft can be pivotally engaged with the pin holes of the connecting slots of said keyboard. By this arrangement, the wrist support can be pivotally and removably attached to the keyboard. Consequently, the wrist support can be readily attached to the keyboard for application or removed therefrom for storage or packing.

9 Claims, 6 Drawing Sheets

KEYBOARD WITH WRIST SUPPORT

FIELD OF THE INVENTION

The present invention relates to keyboard, more particularly, to a keyboard incorporated with a wrist support which can be readily removably attached to the keyboard while the wrist support can also be readily packed together with the keyboard.

DESCRIPTION OF PRIOR ART

In order to prevent the wrist from being injured due to an overload of typing work, a wrist support which can be removably attached to the front edge of the keyboard is provided. In the conventional wrist support, it can be readily divided into a fixed type and a removable type. The fixed type is permanently attached to the front edge of the keyboard and can not be disassembled when not in use. The disadvantage of this fixed type is it has a considerably large bulky dimension which is not economic for packing. The removable type is more flexible on both packing and utilization since it can be readily located adjacent to the front edge of the keyboard for supporting the wrist of a user and can be also removed therefrom for packing or storage. Besides, the wrist support can be readily stacked onto the keyboard for packing. This is readily an economic way.

Nevertheless, the detachable wrist support is suffered from a poor stability since both the wrist support and keyboard are individual elements. Since there is no substantial connection between the wrist support and the keyboard, after a period of usage, the wrist support will drift away from the keyboard and a gap between the wrist support and keyboard will be generated resulted from the frictional force exerted from the wrist of user. If the gap is not compensated by relocating the wrist support toward the keyboard, the gap will bring an uncomfortable feeling to the user. Even when one of the conventional wrist support applies a connection between the wrist support and the keyboard, when the keyboard tilted with different inclination angle, a gap will be generated between the wrist support and the keyboard. Again, an uncomfortable feeling will impart to the wrist of the user.

SUMMARY OF THE INVENTION

It is the objective of this invention to provide a keyboard integrally attached with a wrist support wherein the disadvantages found on the conventional keyboard and wrist assembly can be completely solved.

In order to achieve the object set forth, a keyboard with wrist support comprising a wrist support having a plurality of connecting plates at the rear end surface of said wrist support is provided. The connecting plates are provided with a pair of connecting arms at both ends respectively. Each of the connecting arms is provided with a pin shaft. The bottom of the front end surface of the keyboard is provided with a pair of connecting slots corresponding to the connecting plates of the wrist support. The side walls of the connecting slots are provided with pin holes corresponding to the pin shaft of the connecting arms such that the pin shaft can be pivotally engaged with the pin holes of the connecting slots of said keyboard. By this arrangement, the wrist support can be pivotally and removably attached to the keyboard. Consequently, the wrist support can be readily attached to the keyboard for application or removed therefrom for storage or packing.

BRIEF DESCRIPTION OF THE DRAWINGS

In order that the present invention may more readily be understood the following description is given, merely by way of example with reference to the accompanying drawings, in which.

Brief Description of Numerals

Figure 1:
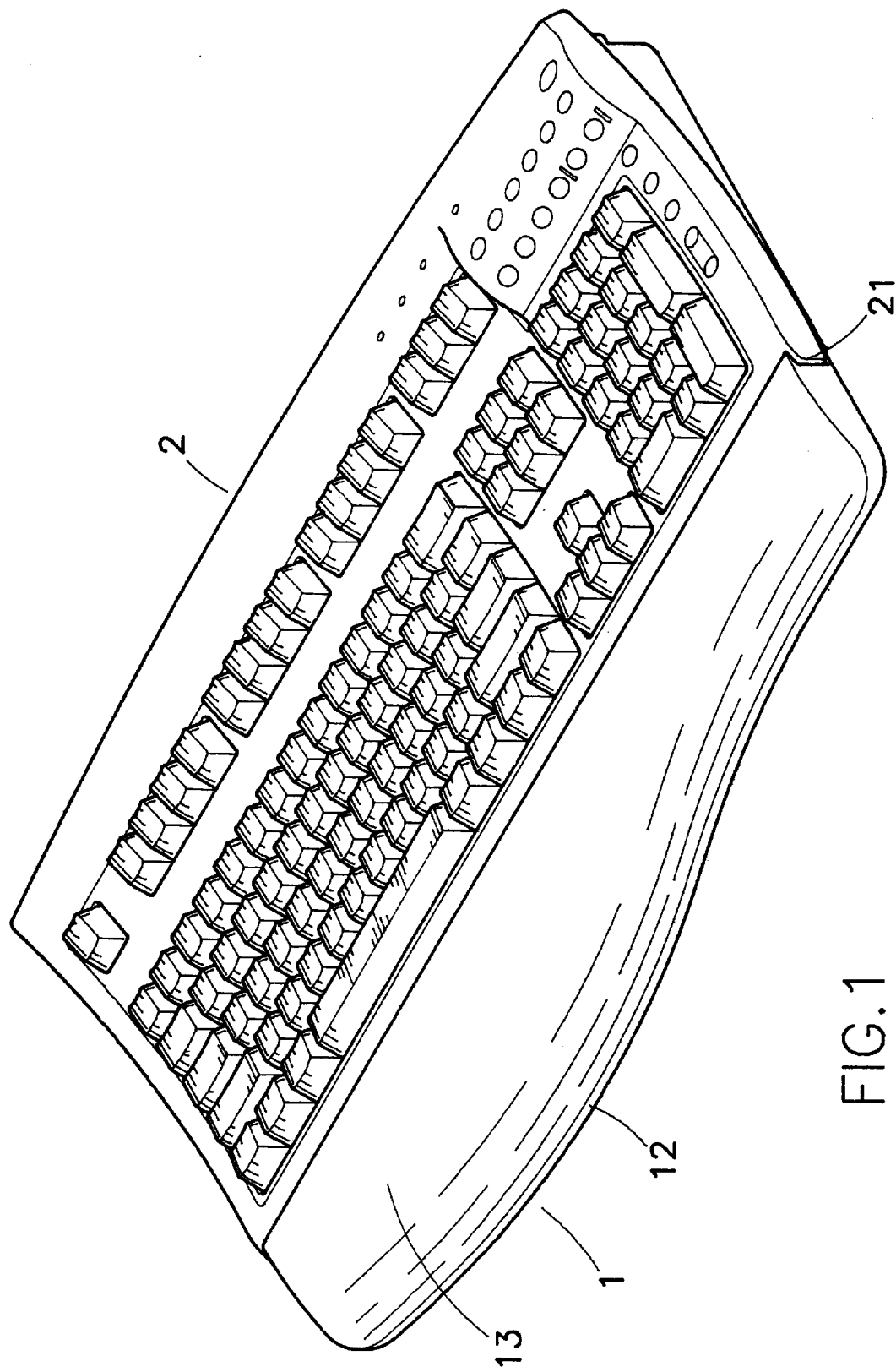
FIG. 1 is a perspective view showing a keyboard integrally attached with a wrist support thereof.
Figure 2:
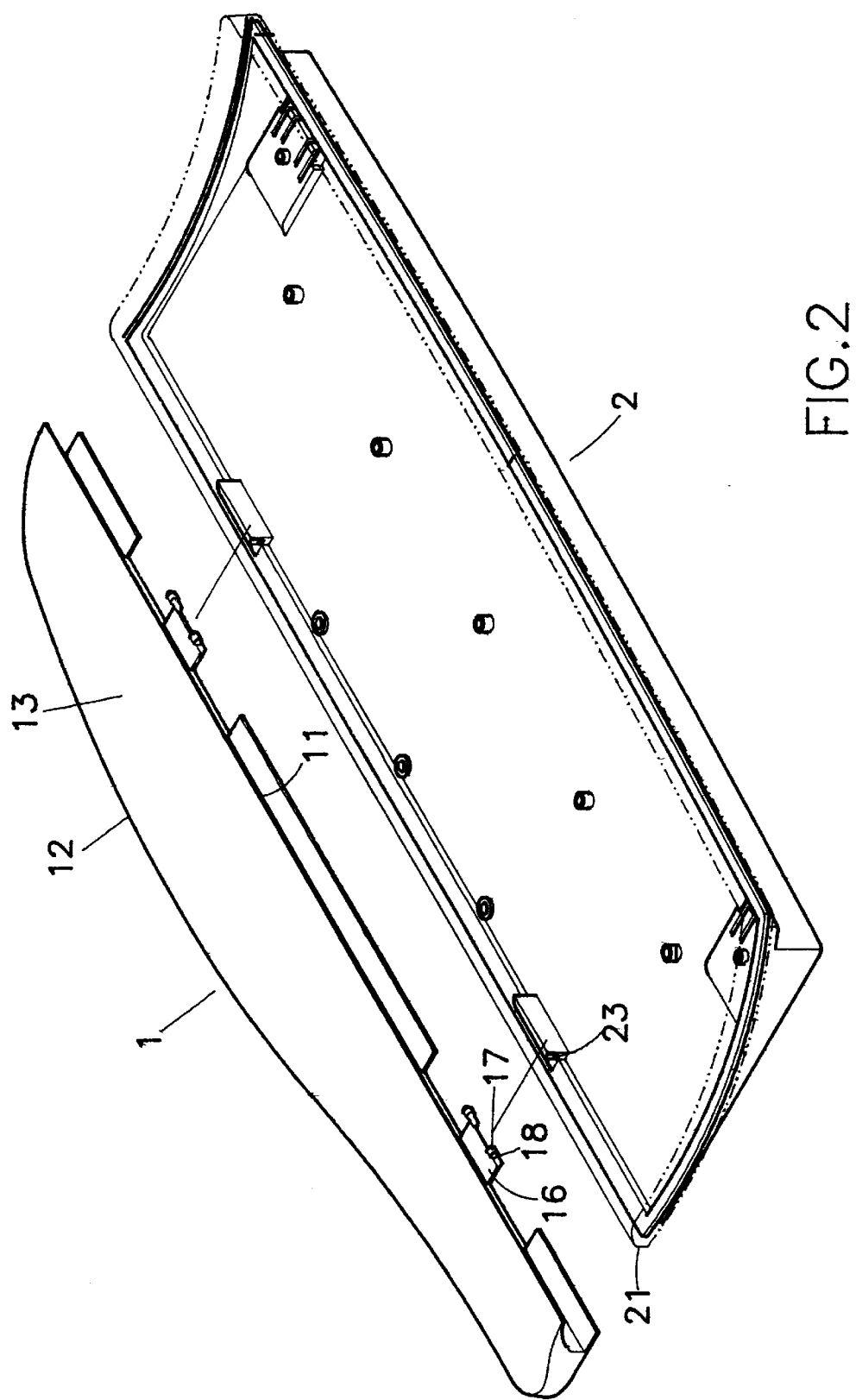
FIG. 2 is a perspective view showing the wrist support is separated from the keyboard.
Figure 3:
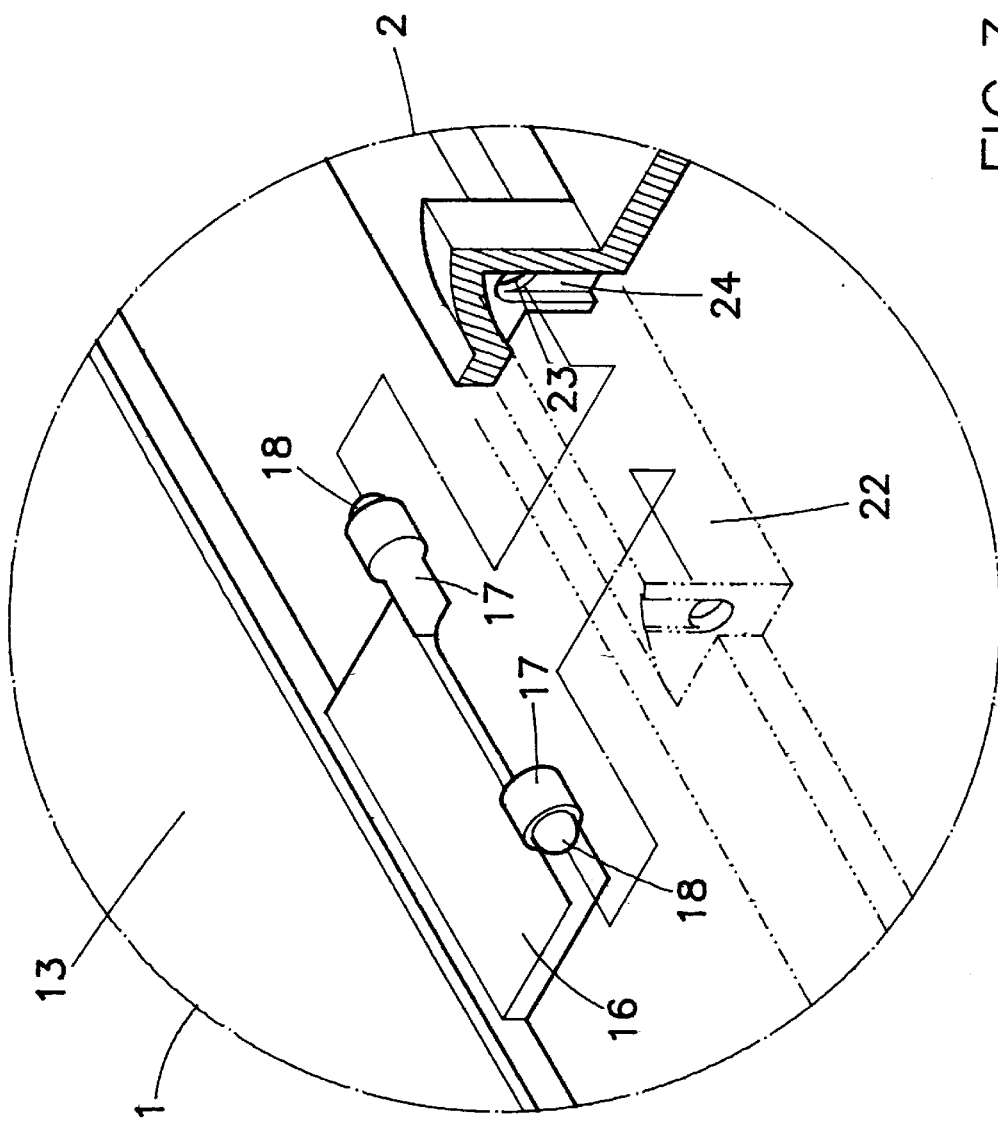
FIG. 3 is a partially enlarged view showing the connecting mechanism between the wrist support and the keyboard.
Figure 4:
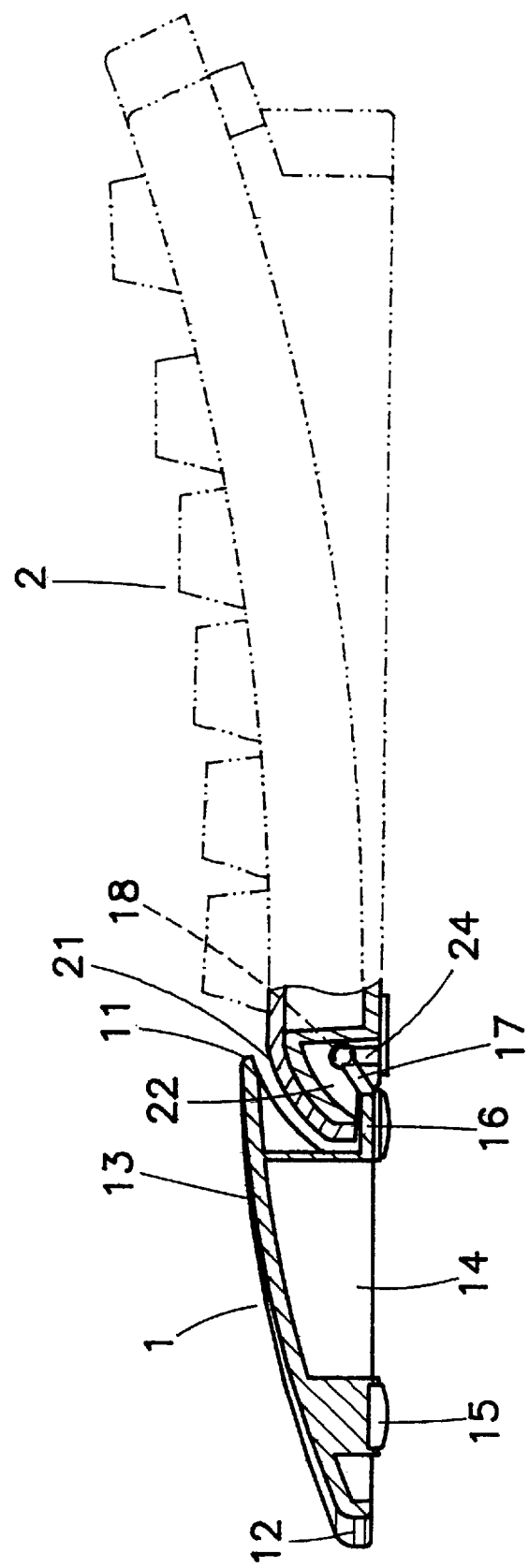
FIG. 4 is a side elevational view showing the wrist support is attached to the keyboard.

| | | | |
|---|---|---|---|
| 1 | wrist support | | |
| 11 | rear end surface | 12 | front end surface |
| 13 | top surface | 14 | reinforced rib |
| 15 | standing pad | 16 | connecting plate |
| 17 | connecting arm | 18 | pin shaft |
| 19 | pinhole | | |
| 2 | keyboard | | |
| 21 | front end surface | 22 | connecting slot |
| 23 | pin hole | 24 | sliding slot |
| 25 | pin shaft | | |

DETAILED DESCRIPTION OF PREFERRED EMBODIMENT

Referring to FIGS. 1, 2, 3 and 4 wherein a perspective view showing a keyboard integrally attached with a wrist support thereof; a perspective view showing the wrist support separated from the keyboard; a partially enlarged view showing the connecting mechanism between the wrist support and the keyboard; a side elevational view showing the wrist support attached to the keyboard are respectively shown in each Figure.

As shown in Figures, the assembly made according to the present invention generally comprises a wrist support 1 which has same width as the keyboard 2. The wrist support 1 has an elongate configuration. The rear end portion 11 of the wrist support 1 and the front surface 21 of the keyboard 2 have the same conjugated configuration such that both surfaces 11 and 21 can be releasably engaged. The front end surface 12 and the top surface 13 of the wrist support 1 is configured to a curved contour to provide a comfortable support to the wrist of the user. The wrist support 1 can be made with hollow configuration to reduce the material cost and the weight. On the other hand, the bottom surface of the wrist support 1 can be provided with reinforced rib 14 to increase the rigidity of the wrist support and standing pads 15 for a stable support.

In the rear end surface 11 of the wrist support 1 is provided with a plurality of connecting plates 16. In the preferable embodiment of the present invention, it generally includes two connecting plates 16. Each of the connecting plate 16 is provided with a connecting arm 17 at the top portion and which is extended rearward. Each connecting arm 17 is also provided with a pin shaft 18 at end. The bottom portion of the front surface 21 of the keyboard is provided with a plurality of connecting slots 22 corresponding to each of the connecting plates 16. Each of the connecting slots 22 further includes a pair of pin holes 23 corresponding to the pin shaft 18 of the wrist support 1. A sliding slot 24 is also disposed under the pin hole 23 such that the pin shaft 18 can be readily received within the pin holes 23 by the help of the sliding slot 24. Besides, the sliding slot 24 can also be eliminated and the pin shaft 18 can be still inserted into the pin hole 23 with a further push.

In assembling the wrist support 1 and the keyboard 2, the pin shafts 18 of the connecting plate 16 are aligned with the corresponding connecting slots 22 of the keyboard 2 such that the pin shafts 18 on the connecting arms 17 can be readily received within the pin holes 23 by the help of the sliding slot 24. By this arrangement, the wrist support 1 is releasably engaged and connected with the keyboard 2.

Once the wrist support 1 is pivotally attached to the keyboard 2, the connection by the pin shaft 18 and the pin holes 23 is firm enough that the wrist support 1 will not drift away by the frictional force exerted from the hand of the user. On the other hand, the wrist support 1 may also be readily released from the keyboard by separating the pin shafts 18 and the pin holes 23 for readily packing, storage and delivery since the wrist support 1 can be piled onto the keyboard.

Figure 5:
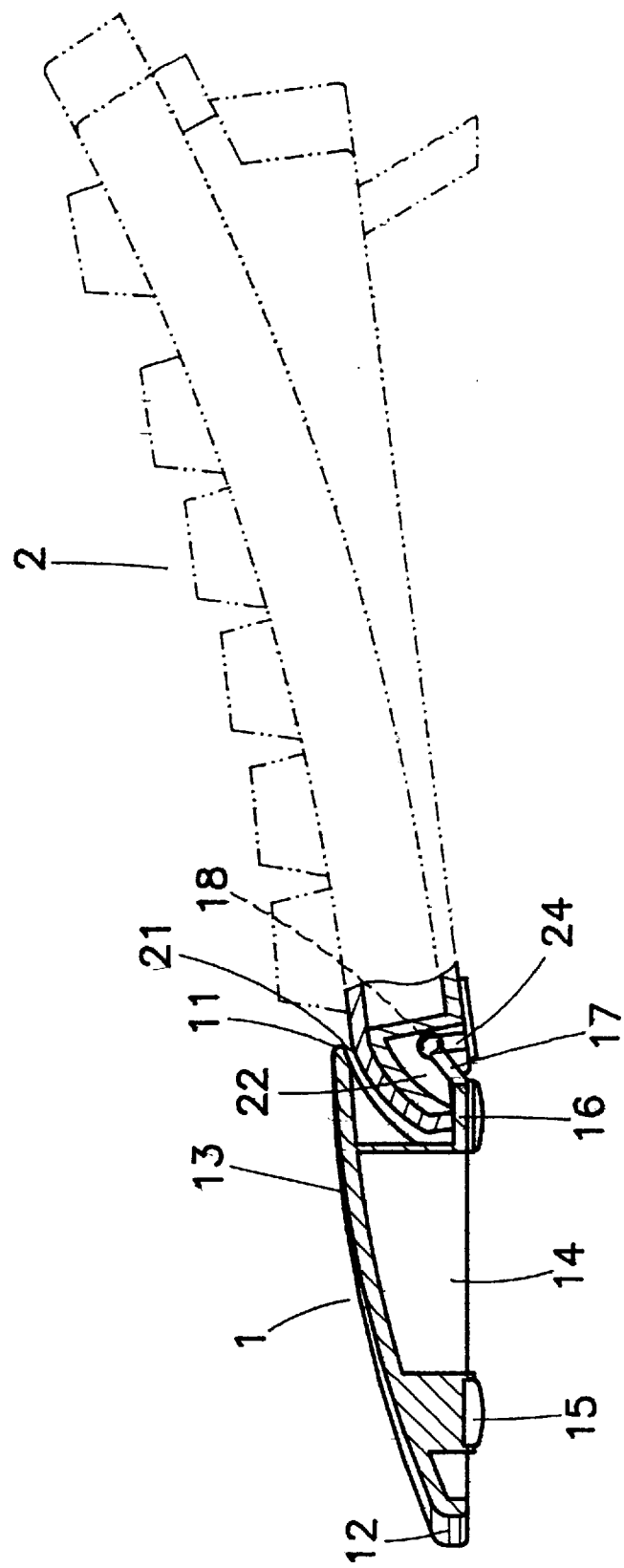
FIG. 5 is still a side elevational view showing the wrist support is attached to the keyboard which is tiled in higher position.

On the other hand, since the wrist support 1 is pivotally connected to the keyboard 2, even when the keyboard 2 is tiled with different angle, as shown in FIG. 5, the wrist support 1 and the keyboard 2 are still well connected together.

Figure 6:
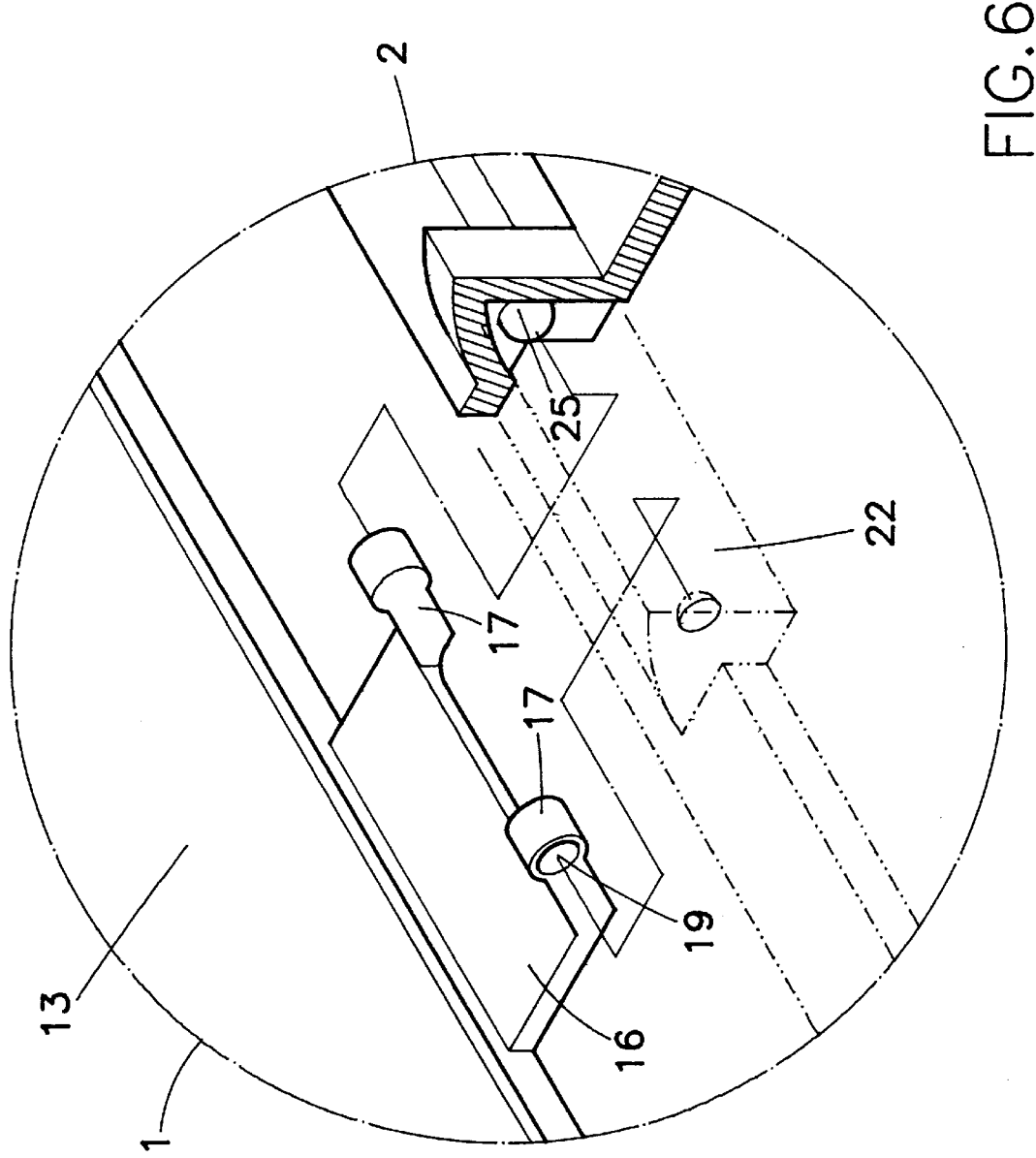
FIG. 6 is a partially enlarged view of another embodiment of the connecting plate and slots.

Referring to FIG. 6, a partially enlarged view of the connection between the wrist support 1 and keyboard 2 is shown. In this embodiment, the connecting arm 17 of the wrist support 1 is provided with pin hole 19 and the side wall of the connecting slot 22 of the keyboard 2 are provided with pin shaft 25 corresponding to those pin hole 19. By this arrangement, the wrist support 1 can still be pivotally attached to the keyboard 2 by the connection between the pin holes 19 and the pin shaft 25.

By the provision of the present invention, the problems encountered by the conventional wrist support and keyboard assembly can be completely solved. Besides, since the connection between the wrist support 1 and the keyboard 2 is stable and durable, it may provide constant support to the user.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A keyboard with wrist support, comprising:

the wrist support having a plurality of connecting plates at a rear end surface thereof, said connecting plates each being provided with a pair of connecting arms, each of said connecting arms being provided with a pin shaft;

the keyboard, a bottom of a front end surface of said keyboard being provided with a plurality of connecting slots at locations corresponding to said connecting plates of said wrist support, a side wall of said connecting slots defining pin holes at locations corresponding to said pin shaft provided on each of said connecting arms, each pin shaft being pivotally received in one of said pin holes of said connecting slots of said keyboard; and a sliding slot disposed below each pin hole of said keyboard for guiding said pin shaft into said pin hole.

2. The keyboard with wrist support as recited in claim 1, wherein:

said connecting arms of said wrist support are provided with pin holes and said side wall of said connecting slots are provided with pin shafts and said pin shafts are pivotally received within said pin holes of said connecting arms of said wrist support.

3. A keyboard and wrist support combination, comprising:

the keyboard having a front end portion and a bottom surface, at least a part of said front end portion having a curved contour shape;

the wrist support having a rear end portion, at least a part of said rear end portion having a curved contour shape; and coupling means for pivotally and releasably coupling said wrist support and said keyboard such that said curved contour shape of said front end portion at least partly overlaps with said curved contour shape of said rear end portion.

4. The keyboard and wrist support combination defined by claim 3, wherein:

said front end portion is a front end protruding portion and said rear end portion is a rear end recessed portion, and said front end protruding portion is at least partly received in said rear end recessed portion.

5. The keyboard and wrist support combination defined by claim 4, wherein:

said curved contour shape of said front end protruding portion is spatially disposed from said curved contour shape of said rear end recessed portion.

6. The keyboard and wrist support combination defined by claim 4, wherein:

said coupling means includes a pin and recess connector.

7. The keyboard and wrist support combination defined by claim 4, wherein:

said coupling means includes at least one connecting plate fixed with the rear end recessed portion of the wrist support and at least one connecting slot defined in the bottom surface of the keyboard, said connecting slot defining at least one pin hole and said connecting plate having a connecting arm supporting at least one pin shaft, said pin shaft being pivotally and removably received in said pin hole.

8. The keyboard and wrist support combination defined by claim 7, wherein:

said connecting slot further defines a pin shaft entry slot, said pin shaft entry slot being connected with said pin hole.

9. The keyboard and wrist support combination defined by claim 4, wherein:

said coupling means includes at least one connecting plate fixed with the rear end recessed portion of the wrist support and at least one connecting slot defined in the bottom surface of the keyboard, said connecting slot having at least one pin shaft extending therefrom and said connecting plate having a connecting arm defining at least one pin hole, said pin shaft being pivotally and removably received in said pin hole.

* * * * *